US012026685B2

(12) United States Patent
Smith et al.

(10) Patent No.: US 12,026,685 B2
(45) Date of Patent: Jul. 2, 2024

(54) METHOD AND APPARATUS FOR BLOCKCHAIN MANAGEMENT

(71) Applicant: Blockdaemon Inc., Los Angeles, CA (US)

(72) Inventors: Matthew Benjamin Smith, Marina Del Rey, CA (US); Julian Vergel de Dios, Los Angeles, CA (US); Sivasubramanian Hyderabadkannan, Redondo Beach, CA (US); Joshua Lederman, Playa Vista, CA (US)

(73) Assignee: Blockdaemon Inc., Los Angeles, CA (US)

( * ) Notice: Subject to any disclaimer, the term of this patent is extended or adjusted under 35 U.S.C. 154(b) by 403 days.

(21) Appl. No.: 15/494,224

(22) Filed: Apr. 21, 2017

(65) Prior Publication Data

US 2018/0308072 A1 Oct. 25, 2018

(51) Int. Cl.
*G06Q 20/06* (2012.01)
*G06Q 20/02* (2012.01)

(52) U.S. Cl.
CPC ......... *G06Q 20/0655* (2013.01); *G06Q 20/02* (2013.01); *G06Q 20/06* (2013.01); *G06Q 2220/00* (2013.01)

(58) Field of Classification Search
CPC ..... G06Q 20/0655; G06Q 20/02; G06Q 20/06
See application file for complete search history.

(56) References Cited

U.S. PATENT DOCUMENTS

| 7,398,310 | B1 | 7/2008 | Kuehl et al. |
| 9,397,985 | B1 * | 7/2016 | Seger, II ............. H04L 63/0442 |
| 9,652,510 | B1 * | 5/2017 | Huang ................... G06N 20/00 |
| 10,803,194 | B2 | 10/2020 | Damgård et al. |
| 11,757,657 | B2 | 9/2023 | Jakobsen et al. |
| 2011/0276607 | A1 * | 11/2011 | Surna .................... G06F 16/221 |
| | | | 707/812 |

(Continued)

FOREIGN PATENT DOCUMENTS

| CN | 109800035 A | 5/2019 |
| CN | 113850578 A | 12/2021 |

(Continued)

OTHER PUBLICATIONS

Xiwei Xu, et al., The Blockchain as a Software Connector, Jul. 21, 2016, IEEE, pp. 182-191 (Year: 2016).*

*Primary Examiner* — Nilesh B Khatri
(74) *Attorney, Agent, or Firm* — Fenwick & West LLP

(57) ABSTRACT

The system is a scalable, flexible, and extensible platform for building, deploying, and managing distributed applications that interact with multiple blockchain technologies. The system implements well-defined and well-managed microservices to encapsulate functionality, isolate sensitive data, enable responsive and efficient scaling, and provide a framework for future improvements and support for future blockchain technologies. The system in one embodiment uses an event-driven architecture to construct fast, responsive systems, but still provide support for alternate modes of operation. The system exposes high-level abstractions of the foundational elements of distributed applications in a powerful, well-understood programming environment to simplify development of extensions, adapters, and applications.

20 Claims, 9 Drawing Sheets

(56) References Cited

U.S. PATENT DOCUMENTS

| | | | |
|---|---|---|---|
| 2011/0289331 A1 | 11/2011 | Kobayashi et al. | |
| 2012/0023142 A1* | 1/2012 | Diorio | G06F 16/215 |
| | | | 707/805 |
| 2012/0259761 A1* | 10/2012 | Subramanian | G06Q 40/04 |
| | | | 705/37 |
| 2016/0234026 A1* | 8/2016 | Wilkins | G06F 21/64 |
| 2016/0260091 A1* | 9/2016 | Tobias | G06Q 20/3678 |
| 2016/0261690 A1* | 9/2016 | Ford | G06F 21/645 |
| 2016/0330034 A1* | 11/2016 | Back | G06Q 40/12 |
| 2017/0295232 A1* | 10/2017 | Curtis | G06F 9/466 |
| 2017/0359288 A1* | 12/2017 | Golan | H04L 67/1095 |
| 2018/0089316 A1* | 3/2018 | Ganot | G06F 16/289 |
| 2018/0225103 A1* | 8/2018 | Krishnan | G06F 8/60 |
| 2022/0277261 A1* | 9/2022 | Stollman | G06Q 10/08 |
| 2022/0327530 A1 | 10/2022 | Pagter et al. | |
| 2023/0179407 A1 | 6/2023 | Jakobsen et al. | |

FOREIGN PATENT DOCUMENTS

| | | |
|---|---|---|
| CN | 113032829 | 6/2022 |
| EP | 3098714 | 2/2023 |
| EP | 4302454 A | 1/2024 |
| JP | 2007202146 A | 8/2007 |
| KR | 20000046343 A | 7/2000 |
| KR | 100287420 B1 | 4/2001 |
| KR | 20010046989 A | 6/2001 |
| KR | 20120093061 A | 8/2012 |
| WO | WO 2022/103882 A1 | 5/2022 |

* cited by examiner

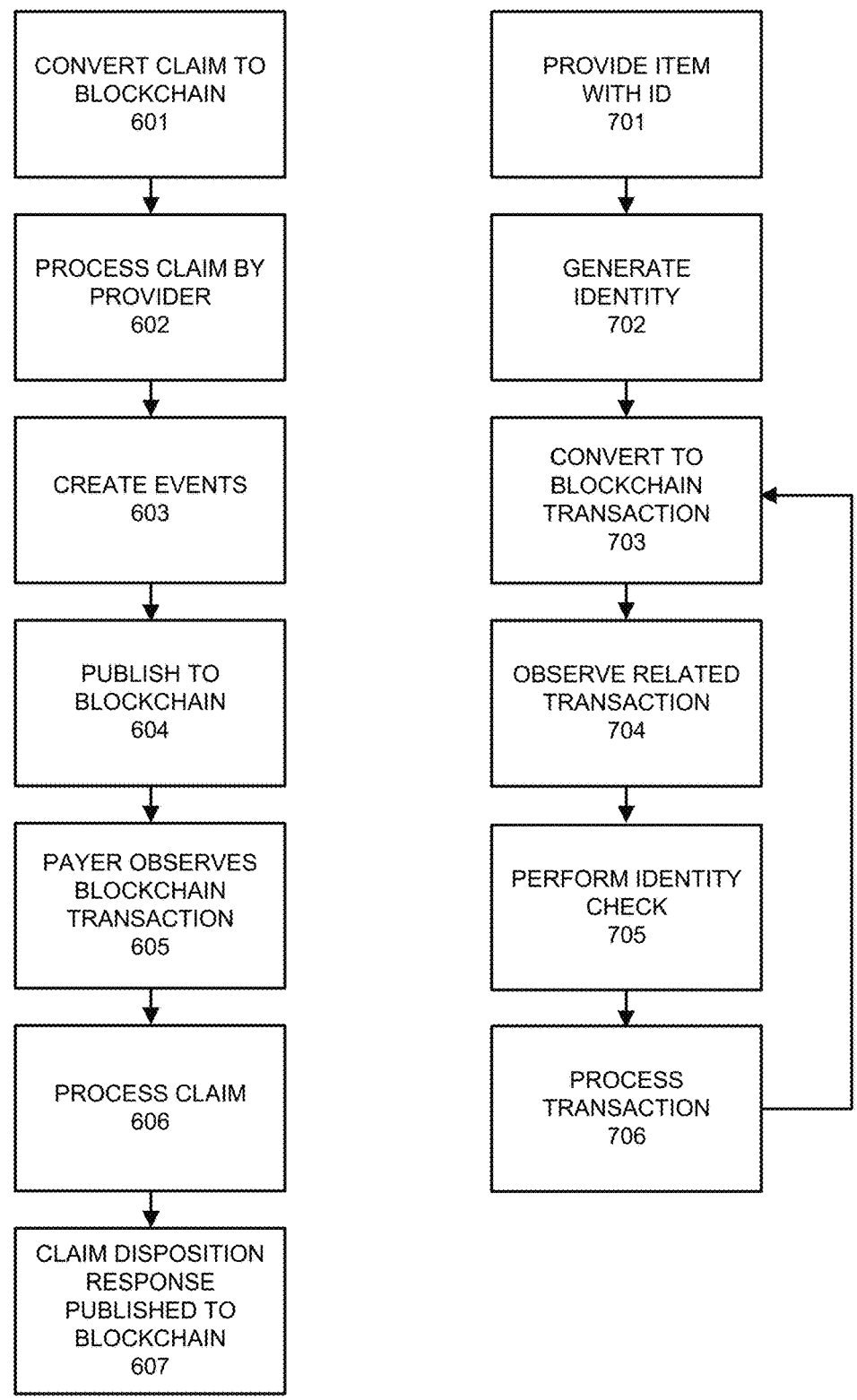

METHOD AND APPARATUS FOR BLOCKCHAIN MANAGEMENT

BACKGROUND OF THE SYSTEM

A blockchain is a distributed database that is comprised of an ordered list of records, referred to as "blocks". Each block is timestamped and contains a link to a previous block. The goal of a blockchain is to provide data security in an autonomous environment. A blockchain network is a decentralized peer-to-peer network whose nodes maintain the history of a blockchain and process new transactions that modify its state. In other words, there is no central authority confirming the reliability and veracity of the blockchain. Instead, decentralized consensus is used to prove data provenance. The first blockchain was the bitcoin blockchain proposed by Satoshi Nakamoto. The bitcoin blockchain represents currency and prevents the double spending of the same currency but without the need for a central server or authorizing agency.

Blockchain reliability via decentralized consensus utilizes a "proof-of-work" model where a large block of data (the blockchain) is processed, such as generating a double hash value with a prescribed number of leading zero bits. Various entities can perform the proof-of-work in a distributed manner, providing reliability and trust without the use of a centralized server of authority.

Since the introduction of bitcoin, a number of alternative blockchains, each using their own design, functionality, and operation, have been created. These alternative networks include LaZooz, Steemit, Ethereum, Counterparty, and the like. More recently, software designed to deploy and maintain custom blockchains but which have no single public network have been developed, including Hyperledger Fabric, Sawtooth Lake, Quorum, and the like. Each different blockchain technology presents its own unique challenges for effective deployment, scalability, and maintenance. Blockchain protocol implementations provide the network protocol, shared persistence, and shared execution environment which make up the blockchain layer, but not the necessary services on top of that layer required to build complete production-scale distributed applications.

As a result, the potential advantages in terms of transparency, immutability and security that are characteristic of blockchain are difficult to achieve. Such performance entails extensive blockchain-specific expertise, infrastructural overhead, complex application development, security and ongoing maintenance. Furthermore there exists very limited interoperability between blockchain technologies, which can only be achieved in specific applications and with similarly complex blockchain-specific expertise. This prevents a structure where data from one blockchain technology can be easily used and distributed with data from other blockchain technologies.

SUMMARY

The system is a scalable, flexible, and extensible platform for building, deploying, and managing distributed applications that interact with multiple blockchain technologies. The system implements well-defined and well-managed microservices to encapsulate functionality, isolate sensitive data, enable responsive and efficient scaling, and provide a framework for future improvements and support for future blockchain technologies. The system in one embodiment uses an event-driven architecture to construct fast, responsive systems, but still provide support for alternate modes of operation. The system exposes high-level abstractions of the foundational elements of distributed applications in a powerful, well-understood programming environment to simplify development of extensions, adapters, and applications.

BRIEF DESCRIPTION OF THE DRAWINGS

FIG. 6 is a flow diagram illustrating the use of the system in a medical claim environment.

FIG. 7 is a flow diagram illustrating the use of the system in a supply chain environment.

DETAILED DESCRIPTION OF THE SYSTEM

Figure 1:
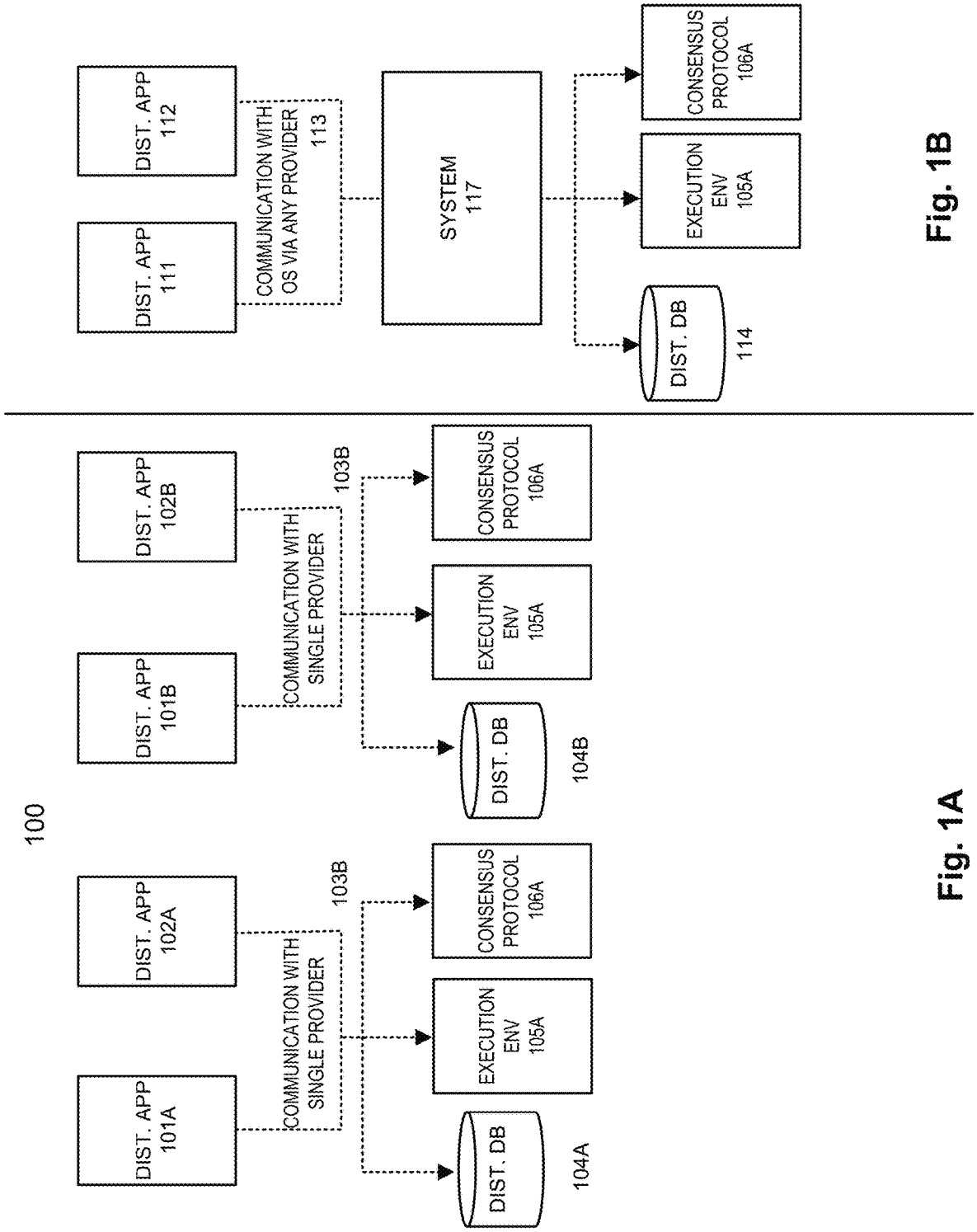
FIG. 1A illustrates the operation of applications in the current art.
FIG. 1B illustrates the operation of applications in an embodiment of the system.

The system provides an interface to allow one or more applications to interact with a plurality of blockchain technologies. FIG. 1A illustrates an example of blockchain application operation in the current state 100. For each blockchain, the system must have a dedicated application set and interface. For example, applications 101A and 101B interface through communication block 103 to a single public blockchain technology that has its own distributed database 104A, execution environment 105A, and consensus protocol 106A. Similarly, for a private blockchain technology (or an additional public blockchain), the current art requires different applications 101B and 102B communicating through interface 103B to separate database 104B, private chain 105B, and proof of state 106B.

The present system is illustrated in one embodiment in FIG. 1B. Applications 111 and 112 communicate through interface 113 to System 117. System 117 provides a uniform interface to any blockchain database 114, to any blockchain execution environment 115, and to any consensus protocol (e.g. proof-of-work, proof-of-stake, traditional Paxos, and the like) 116. The system not only provides a consistent and uniform interface, but is independently scalable at both the microservice and blockchain levels to provide efficient and optimized operation.

The system allows the creation of powerful applications with the advantage of a decentralized environment. In the past, applications were created around a centralized architecture. The centralized applications could be complex and powerful, managing their own application logic, business logic, and data. More recently, there has been a shift away from centralized to decentralized architecture in certain domains. Decentralized applications generally involve many clients taking on partial responsibility for storage and processing services. These decentralized architectures lack a high level control of application intelligence.

The present system provides an environment for powerful, centrally-controlled applications with flexibility of easily composed integration points, while maintaining decentralized storage and processing layers. This provides the best features of the prior art centralized and decentralized architectures while mitigating the disadvantages.

In a blockchain environment, the system allows user to rapidly build useful distributed applications. The system manages the blockchain infrastructure and provides high-level microservices (identity management, data persistence, cryptography, business intelligence and rules management) on top of the blockchain infrastructure. In addition to these microservices, the system also provides the necessary abstraction layer to generalize applications to utilize any lower-level blockchain services (e.g. Ethereum, Hyperledger Fabric, and the like), alone or in combination. The modular and extensible system enables partners to build distributed applications to solve industry specific use cases.

The system 117 in one embodiment is an event-driven, microservice-based platform with separation of concerns across different microservices. Each microservice performs domain-specific tasks and is tailored for optimizing those tasks. This allows the system to scale each microservice independently. This improves the efficiency and scalability of the system, as specific infrastructure resources (e.g. memory, storage, and processing power) can be allocated specifically where they are needed, drastically reducing wasted resources.

In one embodiment, the system is comprised of Data, Identity, Network, and Logic microservices, or components. Each microservice communicates with the others via events (i.e. messages). The system provides for both real-time and historical event processing, facilitating complex business rules for execution in various use cases. In addition, event processing allows independent operation of the microservices in non-sequential manner. Any microservice can act on an event that occurred anywhere else in the system.

Figure 2:
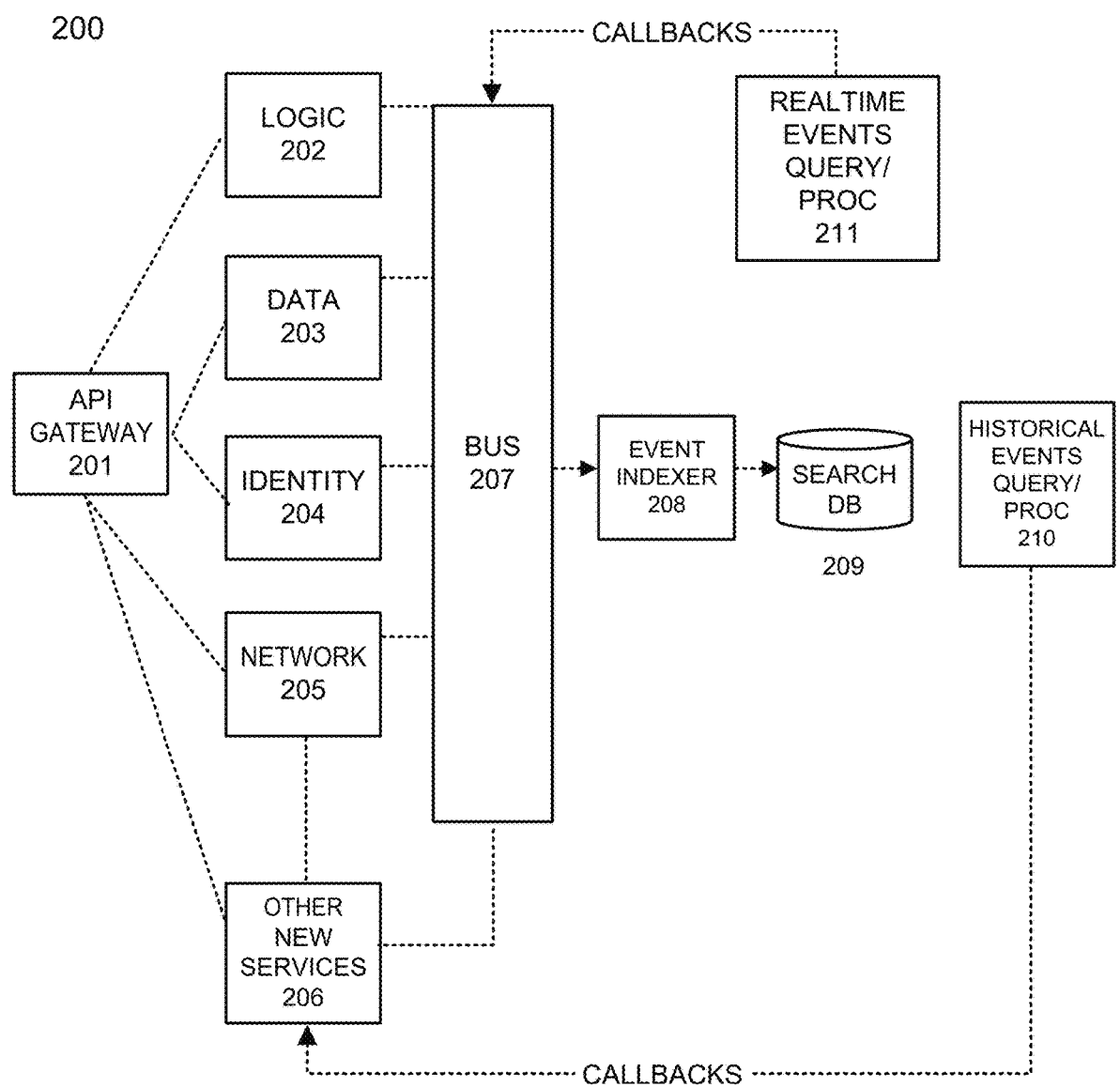
FIG. 2 is a block diagram illustrating an embodiment of the system.

FIG. 2 is a block diagram illustrating an embodiment of the system 200. A user accesses the system through Applications Programming Interface (API) Gateway 201. The API Gateway 201 provides an interface between the system and the external, off-chain world. It provides a public interface to each of the microservices and performs some administrative functions.

The API Gateway 201 communicates with Logic 202, Data 203, Identity 204, Network 205, and Other Services 206. Although the system is described with respect to the microservices noted above, the system is not limited to such an implementation. Other microservices can be implemented and scaled as appropriate in implementing the system.

Message Bus 207 receives Events (messages) from the microservices 202-206 and communicates them to the Event Indexer 208, or to the microservices themselves as appropriate. The Event Indexer 208 tracks and indexes every Event and stores them in Search Database 209 so that the system can operate on real-time Events as well as historical Events. In addition to the Search Database 209, each microservice can have its own associated private storage. The following is an example of an Event Index:

```
{
  "type":"record",
  "name":"EventMessage",
  "fields":[
    {
      "name":"timestamp",
      "type":"int"
    },
    {
      "name":"blockchain",
      "type":"string"
    },
    {
      "name":"event",
      "type":{
        "type":"record",
        "name":"EventRecord",
        "fields":[
          {
            "name":"logindex",
            "type":"long"
          },
          {
            "name":"blocknumber",
            "type":"long"
          },
          {
            "name":"blockhash",
            "type":"string"
          },
          {
            "name":"transactionindex",
            "type":"long"
          },
          {
            "name":"data",
            "type":"string"
          },
          {
            "name":"address",
            "type":"string"
          },
          {
            "name":"topic",
            "type":{
              "type":"array",
              "items":"string"
            }
          },
          {
            "name":"eventSignatureHash",
            "type":"string"
          }
        ]
      }
    }
  ]
}
```

An example which shows values for the various fields in the event structure is listed below.

```
{
  "timestamp":1491435492,
  "blockchain":"926716fa-1723-4b30-8e90-ec01628f3cb0",
  "logIndex":2106,
  "blockNumber":0,
  "blockHash":"0x980608bb3453bf5bbd0d52772a33704b5a8d31aab36b6e09cc192f643ae8f473",
  "transactionIndex":0,
  "date":{
```

```
   "action":"CREATE_IDENTITY",
   "exit_code":"SUCCESS",
   "id":"00000000000000000000000000000001e1741cb67d4daea969cf50cfb7329f",
   "name":"Michael",
   "identity":{
      "address":"bd2d7fa995a158cd478e6eab3100d00ab801302d"
   }
 },
 "topic":[
   "0xb7bedfc64baa38e5659f7a779dcabd6beec390f293243dfacc49479aaab8a5e0"
 ],
 "eventSignatureHash":"0xb7bedfc64baa38e5659f7a779dcabd6beec390f293243dfacc49479aaab8a5e0",
 "address":"0x3e0eb8117e76cd5b30b5d40005f8bc58fe4c53d3"
}
```

Events can be delivered to the microservices through Real-time Events Query/Processor 211. This is used for real-time operation of the system. Historical Events Query/Processor 210 is used to provide historical Events to the microservices for historical event processing.

The Network microservice 205 is a blockchain-agnostic service that provides a generic interface for creating and interacting with arbitrary resources on one or more blockchains. It manages blockchain nodes, processes events from the network, and translates high-level instructions into native on-chain code.

In operation, The Network microservice 205 is used to abstract to the blockchain layer and allows the system to be agnostic to the blockchain technology being accessed. The Network microservice 205 will normalize data from the blockchain, using interfaces and processes in Network for each type of blockchain technology. The normalization of the blockchain data retrieves data and metadata from each blockchain for further processing by the rest of the system, including the other microservices. By normalizing the data, Logic and other microservices can process the data in the same manner, regardless of the underlying blockchain technology. This simplifies the design and implementation of the microservices.

Figure 10:
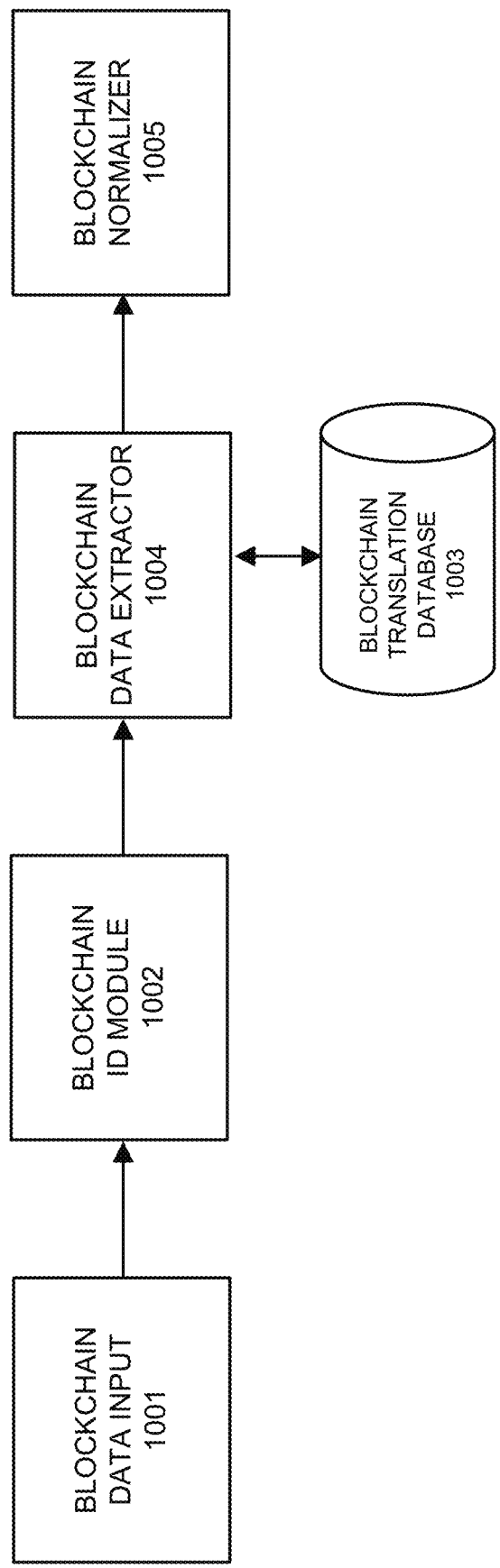
FIG. 10 is an example of an embodiment of the Network Microservice 205.

FIG. 10 is an example of an embodiment of the Network Microservice 205. Blockchain data input module 1001 receives the blocks from the blockchain via a blockchain node (managed by Network 205). The Blockchain Data Input module 1001 provides each block to Blockchain ID module 1002 that determines the underlying blockchain technology of the block. This may be accomplished via accompanying metadata, by setting the Network 205 for a particular type of blockchain technology, or by examining the blockchain for identifying characteristics of its underlying type.

A Blockchain Data Extractor module 1004 is coupled to a Blockchain Translation Database 1003 that provides the appropriate process for extracting data from this particular type of blockchain. The extracted data is provided to Blockchain Normalizer module 1005 to convert the extracted data to a type that can be used with the remainder of the system and the associated microservices.

The following is an example of a normalized data structure from a block:

```
{
   "id":"http://gemos.gem.co/network/blockchain-event#",
   "$schema":"http://json-schema.org/draft-04/schema#",
   "description":"Implementation-independent blockchain event",
   "type":"object",
   "additionalProperties":false,
   "properties":{
      "timestamp":{
         "$ref":"#/definitions/epoch"
      },
      "observed_timestamp":{
         "$ref":"#/definitions/epoch"
      },
      "blockchain_id":{
         "$ref":"#/definitions/uuid"
      },
      "block_hash":{
         "type":"string"
      },
      "height":{
         "type":"integer"
      },
      "transaction_id":{
         "type":"string"
      },
      "transaction_idx":{
         "type":"integer"
      }
      "event_type":{
         "type":"string"
      },
      "ext":{
         "$ref":"#/definitions/blockchain-impl-event"
      },
      "data":{
         "type":"object"
      }
   },
   "required":[
      "observed_timestamp",
      "blockchain_id",
      "block_hash",
      "height",
      "transaction_id",
      "event_type",
      "ext",
      "data"
   ],
   "definitions":{
      "uuid":{
         "type":"string",
         "pattern":"^[a-fA-F0-9]{8}-[a-f4-F0-9]{4}-[a-fA-F0-9]{4}-[a-fA-F0-9]{4}-[a-fA-F0-9]{12}$"
      },
      "blockchain-impl-event":{
         "type":"object"
      },
      "epoch":{
         "type":"integer",
         "format":"utc-millisec"
      }
   }
}
```

The Identity microservice 204 provides secure key management and signing capabilities. Identity 204 supports multiple formats and protocols and can optionally integrate with an existing identity management solution (e.g. LDAP, HSMs, and the like). This allows for secure management of organizational identities using the system. The Identity microservice 204 is used to create decentralized identities that can be stored on a blockchain. Identities can represent users, entities, assets, uniform resourced identifiers (URI) or any other nameable items. The Network microservice 205 can store a record of the identity in a distributed registry on a blockchain, after the identity has been created. Subsequent identity access is managed by the Identity microservice.

The Data microservice 203 is a data persistence microservice that provides a secure arbitrary data storage service for an application using the system. A blockchain may not be an ideal storage medium for most types of data. Data 203 integrates with existing private data-stores to allow database-level integration with existing systems. The Data microservice 203 supports multiple backend data-store drivers, schema validation, canonical serialization, encryption, and document hashing.

Identity 204 can also create and manage permissions associated with each identity. The permissions can be stored in the blockchain. This prevents tampering with both the identity and the associated permissions. This allows centralized control of users that might have access to data and processes so that only authorized users can perform certain functions.

The Logic microservice 202 is a rules engine that provides a familiar programming environment with full access to the other microservices. Logic programs can execute on-chain via smart contracts, but can also respond to and control off-chain events as well as execute or respond to any other business functions needed to automate processes. External services can also be accessed via Logic 202. A smart contract is a collection of code (its functions) and data (its state) that resides at a specific address on the blockchain database. It essentially contains programming logic which executes on the blockchain and all thereby all the participants of the blockchain get to see the result of the smart contract execution.

The Logic microservice 202 provides the processing capability needed to automate business processes from the blockchains. It has access to Events from other microservices both in real-time through the Real-time Events Processor 211 and historically through the callback mechanism of the Historical Processor 210.

Logic 202 uses "Elements" which are code units offering any type of functionality that can easily be composed. Elements execute off-chain in the private execution environment of Logic 202 by default, but can create and interact with on-chain resources through the Network microservice 205 as desired. They can interact with the external Internet and have their own private storage. They can be triggered by an external call to the system API, blockchain events, other Elements, messages from other system microservices, even messages from e.g. a third party cloud service. These elements form the foundation of automating various kinds of business processes in the system.

Figure 3:
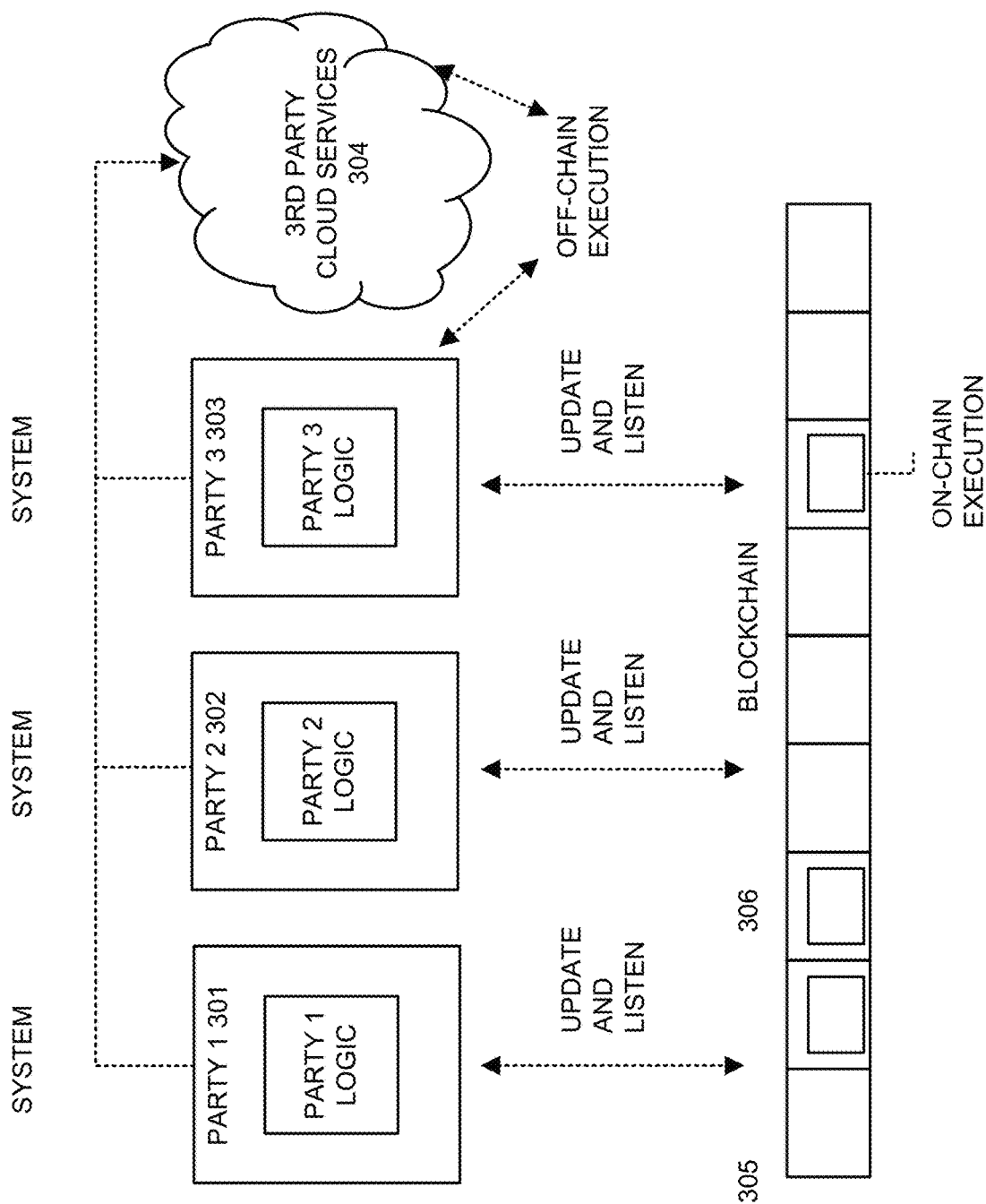
FIG. 3 is a block diagram illustrating on-chain and off-chain execution in an embodiment of the system.

An example of off-chain and on-chain execution of Elements is illustrated in FIG. 3. The system contemplates that a plurality of users (e.g. "Parties") can create their own Logic using the system and interact with a blockchain. In FIG. 3 there is Party 1 301, Party 2 302, and Party 3 303 operating in environment 300. Each party instance has its own specific Logic comprised of Elements that can perform functions on the blockchain 305. Each Party may perform off-chain execution on data provided by local storage and/or $3^{rd}$ party cloud services 304, or on-chain execution on specific blocks (e.g. block 306) of blockchain 305.

The off-chain execution in one embodiment may utilize the Historical Events Query/Processor 210 of the embodiment of FIG. 2 for executing on data and/or processes associated with the $3^{rd}$ party cloud services 304. In some cases, a blockchain will require external current information that is not practical to store in a blockchain. Such data could include current prices, weather conditions, currency values, inventory, and the like, that are monitored and maintained by such $3^{rd}$ party services 304. The communication between one Party and another through the blockchain may rely on such $3^{rd}$ party data. By permitting on-chain and off-chain execution, the system allows for these conditional processes and Events.

When one or more of the Parties uses off-chain data for a process or calculation related to the blockchain, that data that was used can be recorded onto the blockchain as a history of the operation, providing provenance and a reviewable history of the operations of each Party on the blockchain. This is similar to the "oracle" mechanism used by some existing distributed blockchain applications, with the distinction that it is agnostic to the blockchain technology in use.

Inter-Platform Communication

Figure 4:
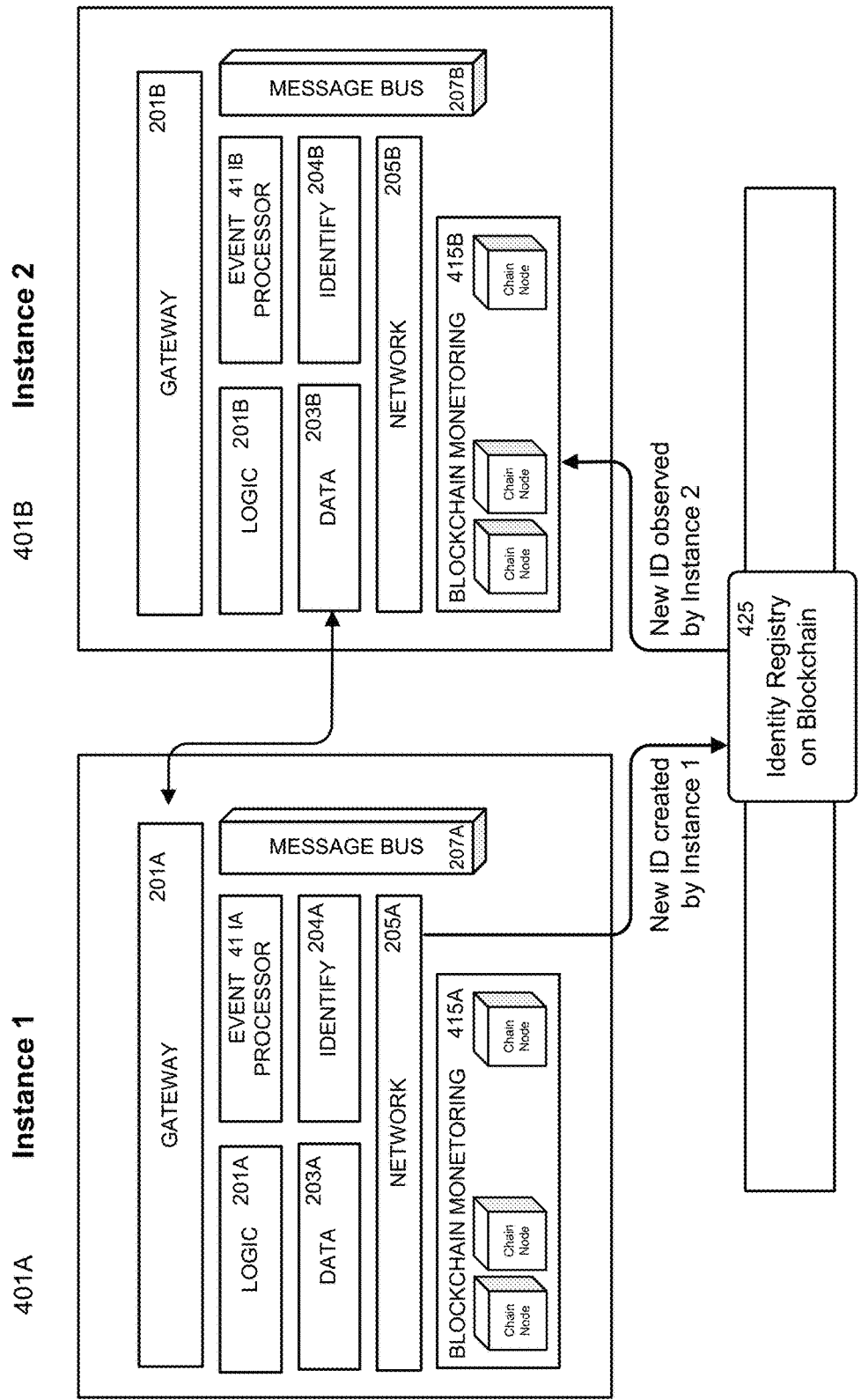
FIG. 4 is a block diagram illustrating identity processing in an embodiment of the system.

FIG. 4 is a block diagram that illustrates identity sharing across multiple instances of the system in environment 400. There are two Instances 401A and 401B. Each instances includes the microservices available in an embodiment of the system. For example Instance 401A includes API Gateway 201A, Logic 201A, Data 203A, Identity 204A, and Network 205A. Message Bus 207A provides communication among the microservices, Blockchain Monitoring 415A, and Event Processor 411A.

Similarly, Instance 401B includes API Gateway 201B, Logic 201B, Data 203B, Identity 204B, and Network 205B. Message Bus 207B provides communication among the microservices, Blockchain Monitoring 415B, and Event Processor 411B.

Only a single Event Processor 411A and 411B is shown in each Instance, but the Event Processor could provide both real-time event processing as well as historical event processing.

Consider the situation where Instance 1 creates an Identity using the Identity microservice 204A. Instance 1 defines all aspects of the identity, including permissions, and stores a record of it in a distributed registry 425 on blockchain 420 via the Network microservice 205A. In addition, Instance 1 can store private data related to the identity via the Data microservice 203A. Instance 2 may retrieve the identity from Registry 425 in blockchain 420 and request access to the private data from Instance 1 through its Gateway 201A. However, if Instance 2 desires access to the private data stored in the identity, it will be up to Instance 1 to grant the access. The granting of access may be via permissions embedded into the identity, or via communication between Instance 1 and Instance 2. It should be noted that blockchain 420 can be of any blockchain technology, and the agnostic aspects of Instance 1 and Instance 2 can process blockchains of any type. Blockchain monitoring block has the functionality to monitor the events occurring on the blockchain. This monitoring helps the system to take specific action based on the type of event and the data it contains.

Figure 5:
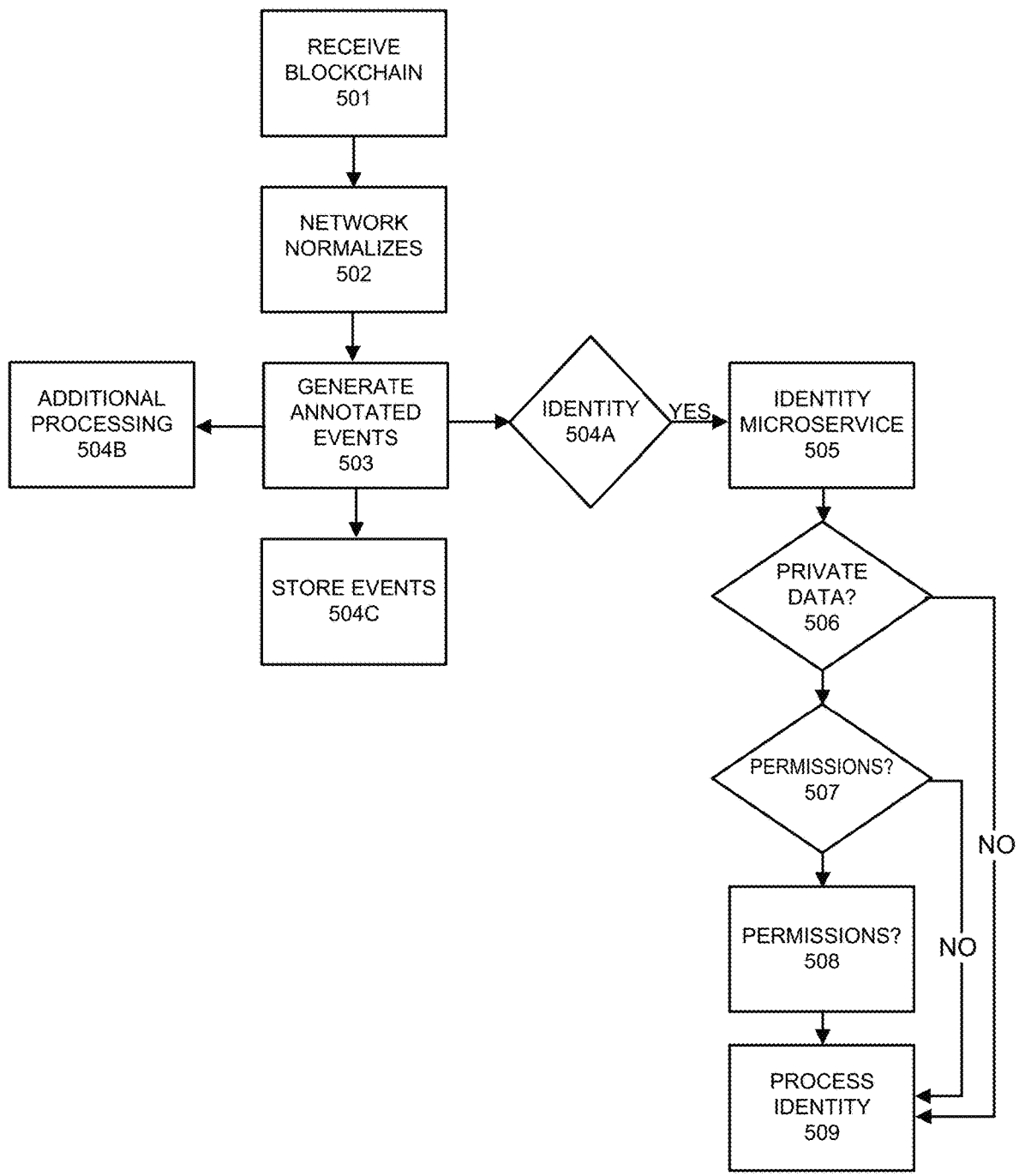
FIG. 5 is a flow diagram illustrating the operation of the system in one embodiment.

FIG. 5 is a flow diagram illustrating the operation of the system in one embodiment. At step 501 a transaction or block from a blockchain is received through Gateway 201 and provided to Network 205. At step 502, the Network microservice 205 processes the Event and converts data and resources from the node into a normalize format for use in one or more of the other microservices.

At block 503, the normalized Event enters the system's message queue where it can be consumed by any service which is interested in it (this happens concurrently). At block 504C the event is indexed through Indexer 208. At block 504B, any other microservice which has interest in the Events will receive and proceed to process them in whatever manner required. The processing may be real-time at processor 211, historical at processor 210, or some combination of the two, depending on the Logic 202. An example of this processing begins at block 504A.

At decision block 504A it is determined if there is identity information in the Event to be processed. If so, the system proceeds to step 505 and the identity information is provided to the Identity microservice 204. At decision block 506 it is determined if there is private data to be retrieved from the identity. If so, it is determined if permissions are required at decision block 507. If so, the permissions are obtained at step 508 and the system retrieves the private data. At step 509 the system processes the identity pursuant to any instructions as appropriate (this may include generating additional events to be processed by other microservices).

If there is no private data to be retrieved at step 506 the system proceeds to step 509. If there are no permissions required at step 507, the system proceeds to step 509. If there is no identity information to be processed at step 504A, or after step 508, the system proceeds to step 509.

Example Implementations

FIG. 6 is a flow diagram of the operation of the system in a medical insurance implementation. At step 601 a service provider presents a claim after services are performed and the claims document is converted into blockchain format using any of the available blockchain technologies. The blockchain technology both guarantees the provenance of the data and the security of the data (e.g. HIPPA compliance). At step 602 the claim, in blockchain form, is presented to the system where it is normalized, and the data is provided to the Logic and other microservices for processing. This may occur, for example, at Instance 1 of FIG. 4.

Each Logic or other microservice operation creates an Event at step 603 that can be used by any of the microservices, if desired, and is stored in the database of Instance 1. At step 604, the claim is published as a blockchain transaction, where it can be observed and processed by, for example, an insurance company (Instance 2). At step 605 the insurance company receives the claim on the blockchain and, using its Network microservice, converts the block into a normalized form.

The system contemplates that each patient may have their own unique blockchain for use by medical professionals. In this manner, the blockchain will include the history of the patient, including other claims. In some cases, the blockchain may be unique to provider, provider and patient, patient and insurance company, and the like. At step 606 the insurance company can process the claim, using historical events related to the patient and provider, along with data associated with the insurance policy of the patient. In some cases the insurance company will rely on both historical events as well as current $3^{rd}$ party services (e.g. has the patient paid the necessary premiums).

At step 607 the processing leads to a decision and amount of payment and a new transaction encapsulating the operations performed at Instance 2 is published to the blockchain for further processing. In many cases, a claim from a service provider may pass through the hands of several hundred people during its processing. The user of the blockchain allows the security, history, and provenance of the data and identity associated with the claim to be maintained in a reliable manner.

FIG. 7 is a flow diagram illustrating the operation of the system in connection with a supply chain in one embodiment. At step 701 an item is provided with identifying information. The information can be a bar code, QR code, RFID, serial number, embedded chip or resistor, or any suitable manner of ensuring the provenance of the item. Ideally the identity information should be tamper resistant, adding to the reliability of the provenance of the product or item. Such identification can be important in a number of industries and supply chains, including pharmaceutical, auto parts, consumer goods, high fashion accessories, gems, jewelry, and the like. The item identification becomes an identity created by the Identity microservice 204 at step 702. The identity and other associated item information is then converted into a blockchain transaction at step 703. For each future transaction related to the item (step 704), the system performs an identity check at step 705, processes the transaction to create events at step 706, and awaits future related transactions. At any time, the identity of the item can be checked and the provenance established by use of the environment of the system.

The transactions can represent any step in the supply chain, such as manufacturing, distribution, wholesale, and all transportation and delivery. In addition, the blockchain can be available for all retail and resale transactions associated with the item, as well as all repair events associated with the item, as appropriate. It should be noted that an item may be associated with an individual identity, a production lot identity, a shipping container identity, and the like, with all identities being updated as appropriate for each transaction.

Figure 8:
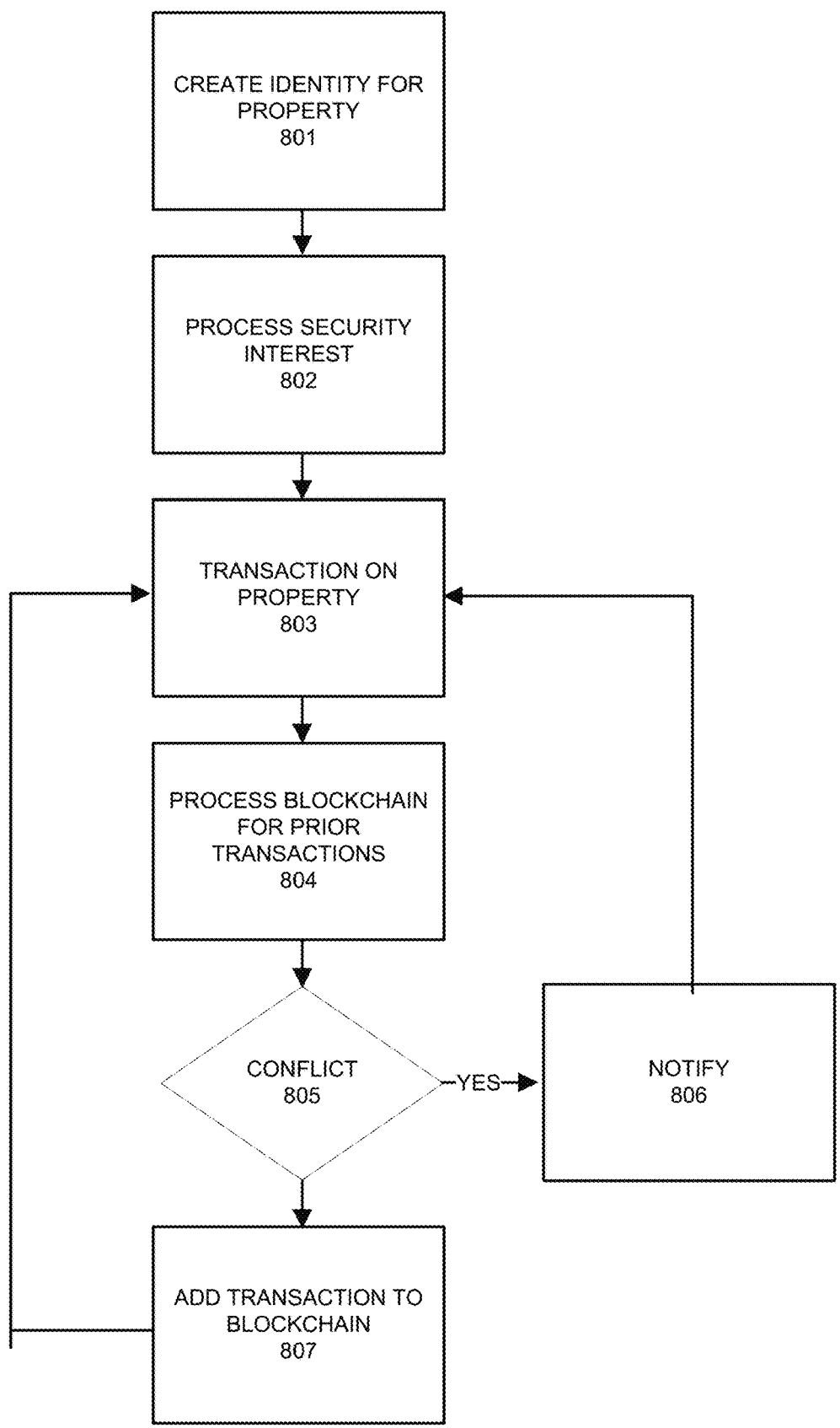
FIG. 8 is a flow diagram illustrating the use of the system in a security interest recording environment.

FIG. 8 is a flow diagram illustrating the use of the system in a security interest recording environment in one embodiment. At step 801, a property or item is provided with an identity that can be used and associated with a security interest. This may be a loan, mortgage, assignment, license, or the like. The property may be real, physical, or intellectual property. The use of licenses in the entertainment world is particularly subject to difficulty in tracking the myriad of licenses and rights grants around the world. In one embodiment, a content property (e.g. a film) could have a single identity in a blockchain and all rights grants are recorded onto the blockchain.

At step 802 the security interest is processed by Logic 202 and the details of the security interest are added to the identity of the property by Network 205 and converted to a blockchain using any of the available blockchain technologies. At step 803 a new transaction takes place on the property. At block 804 the blockchain of the property is processed for conflicting transactions (e.g. security interest, prior sale, exclusive license, and the like).

At decision block 805 it is determined if there are any conflicting rights grants or encumbrances on the property that would impact the present transaction. If so, the parties are notified of the conflict at step 806. If not, the transaction proceeds and the new transaction is added to the blockchain at step 807.

When a security interest is removed or satisfied, the blockchain of the property can be updated to reflect that fact. The system has many benefits over the current art of recording transactions in a central location overseen by some authority (e.g. patent office, county recorder's office, IRS, bank, and the like). A disadvantage of the current system is lost documents, errors in documents, delayed processing of document recording that result in windows of uncertainty, and a need to search many sources to confirm the ability to transact related to the property.

Example Processing Environment

Figure 9:
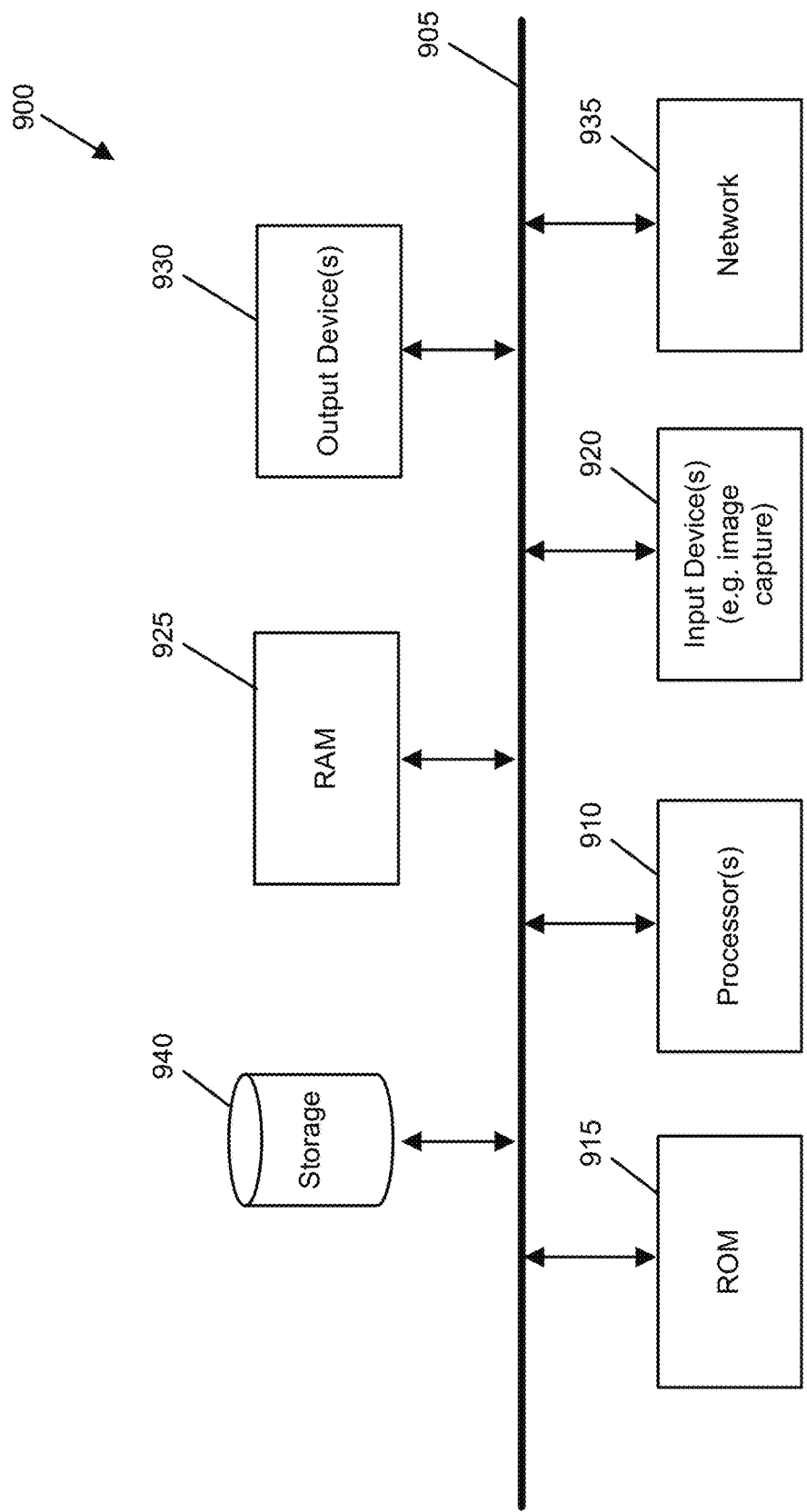
FIG. 9 is an example computing environment for use in an embodiment of the system.

FIG. 9 illustrates an exemplary a system 900 that may implement the system. The electronic system 900 of some embodiments may be a mobile apparatus. The electronic system includes various types of machine readable media and interfaces. The electronic system includes a bus 905, processor(s) 910, read only memory (ROM) 915, input device(s) 920, random access memory (RAM) 925, output device(s) 930, a network component 935, and a permanent storage device 940.

The bus 905 communicatively connects the internal devices and/or components of the electronic system. For instance, the bus 905 communicatively connects the processor(s) 910 with the ROM 915, the RAM 925, and the permanent storage 940. The processor(s) 910 retrieve instructions from the memory units to execute processes of the invention.

The processor(s) 910 may be implemented with one or more general-purpose and/or special-purpose processors. Examples include microprocessors, microcontrollers, DSP processors, and other circuitry that can execute software. Alternatively, or in addition to the one or more general-purpose and/or special-purpose processors, the processor may be implemented with dedicated hardware such as, by way of example, one or more FPGAs (Field Programmable Gate Array), PLDs (Programmable Logic Device), controllers, state machines, gated logic, discrete hardware components, or any other suitable circuitry, or any combination of circuits.

Many of the above-described features and applications are implemented as software processes of a computer programming product. The processes are specified as a set of instructions recorded on a machine readable storage medium (also referred to as machine readable medium). When these instructions are executed by one or more of the processor(s) 910, they cause the processor(s) 910 to perform the actions indicated in the instructions.

Furthermore, software shall be construed broadly to mean instructions, data, or any combination thereof, whether referred to as software, firmware, middleware, microcode, hardware description language, smart contract code, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by the processor(s) 910. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

Also, in some embodiments, multiple software inventions can be implemented as sub-parts of a larger program while remaining distinct software inventions. In some embodiments, multiple software inventions can also be implemented as separate programs. Any combination of separate programs that together implement a software invention described here is within the scope of the invention. In some embodiments, the software programs, when installed to operate on one or more electronic systems 900, define one or more specific machine implementations that execute and perform the operations of the software programs.

The ROM 915 stores static instructions needed by the processor(s) 910 and other components of the electronic system. The ROM may store the instructions necessary for the processor(s) 910 to execute the processes provided by the system. The permanent storage 940 is a non-volatile memory that stores instructions and data when the electronic system 900 is on or off. The permanent storage 940 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer.

The RAM 925 is a volatile read/write memory. The RAM 925 stores instructions needed by the processor(s) 910 at runtime, the RAM 925 may also store the real-time video or still images acquired by the system. The bus 905 also connects input and output devices 920 and 930. The input devices enable the user to communicate information and select commands to the electronic system. The input devices 920 may be a keypad, image capture apparatus, or a touch screen display capable of receiving touch interactions. The output device(s) 930 display images generated by the electronic system. The output devices may include printers or display devices such as monitors.

The bus 905 also couples the electronic system to a network 935. The electronic system may be part of a local area network (LAN), a wide area network (WAN), the Internet, or an Intranet by using a network interface. The electronic system may also be a mobile apparatus that is connected to a mobile data network supplied by a wireless carrier. Such networks may include 3G, HSPA, EVDO, and/or LTE.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other apparatuses, devices, or processes. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 19(f) unless the element is expressly recited using the phrase "means for" or, in the case of a method claim, the element is recited using the phrase "step for."

What is claimed is:

1. A computer-implemented method comprising:
   creating an identity of a named entity that is associated with a blockchain address that uniquely identifies the named entity;
   recording a record of the identity in a distributed registry on a blockchain, the record of the identity including the blockchain address that uniquely identifies the named entity;
   receiving a plurality of blockchain blocks containing historical blockchain events that are associated with the blockchain address, the blockchain blocks having data related to the historical blockchain events related to the named entity;
   extracting the data associated with the historical blockchain events related to the named entity and normalizing the extracted data to provide normalized data;
   providing the normalized data to a first application operated by a first party and to a second application operated by a second party, wherein each of the first application and the second application comprises at least one of a plurality of blockchain technology type agnostic microservices, wherein each blockchain technology type agnostic microservice comprises a plurality of code units each providing a type of functionality, wherein the first application comprises a first blockchain technology type agnostic microservice and the second application comprises a second blockchain technology type agnostic microservice; and
   executing the first blockchain technology type agnostic microservice of the first application, wherein executing the first blockchain technology type agnostic microservice comprises:
      executing part of the normalized data associated with the named entity in a first off-chain operation in a first private execution environment, and
      utilizing first off-chain data associated with the named entity for executing the first off-chain operation in the first private execution environment;
   executing the second blockchain technology type agnostic microservice of the second application, wherein executing the second blockchain technology type agnostic microservice comprises:
      executing part of the normalized data associated with the named entity in a second off-chain operation in a second private execution environment, and
      utilizing second off-chain data associated with the named entity for executing the second off-chain operation in the second private execution environment;
   causing to record, in the distributed registry on the blockchain, a first result of executing the first off-chain data by the first application to the blockchain; and
   causing to record, in the distributed registry on the blockchain, a second result of executing the second off-chain data by the second application to the blockchain, wherein the first result and the second result are associated with the named entity and are identifiable on the blockchain using the record of identity.

2. The method of claim 1 wherein the identity is extracted by an identity microservice.

3. The method of claim 1 further comprising applying logic in a real-time operation in executing the first blockchain technology type agnostic microservice and the second blockchain technology type agnostic microservice.

4. The method of claim 1 further comprising applying a historical event to the blockchain block.

5. The method of claim 1, wherein the first off-chain data is obtained from a third-party data source.

6. The method of claim 1, wherein the first private execution environment is a local storage or a cloud service.

7. The method of claim 1, wherein the normalized data are indexed to reflect the historical blockchain events that associated with the named entity.

8. A non-transitory computer-readable medium configured to store code comprising instructions, wherein the instructions, when executed by one or more processors, cause the one or more processors to perform steps comprising:
   creating an identity of a named entity that is associated with a blockchain address that uniquely identifies the named entity;
   recording a record of the identity in a distributed registry on a blockchain, the record of the identity including the blockchain address that uniquely identifies the named entity;
   receiving a plurality of blockchain blocks containing historical blockchain events that are associated with the blockchain address, the blockchain blocks having data related to the historical blockchain events related to the named entity
   extracting the data associated with the historical blockchain events related to the named entity and normalizing the extracted data to provide normalized data;
   providing the normalized data to a first application operated by a first party and to a second application operated by a second party, wherein each of the first application and the second application comprises at least one of a plurality of blockchain technology type agnostic microservices, wherein each blockchain technology type agnostic microservice comprises a plurality of code units each providing a type of functionality, wherein the first application comprises a first blockchain technology type agnostic microservice and the second application comprises a second blockchain technology type agnostic microservice; and executing the first blockchain technology type agnostic microservice of the first application, wherein executing the first blockchain technology type agnostic microservice comprises:
   executing part of the normalized data associated with the named entity in a first off-chain operation in a first private execution environment, and
   utilizing first off-chain data associated with the named entity for executing the first off-chain operation in the first private execution environment;
executing the second blockchain technology type agnostic microservice of the second application, wherein executing the second blockchain technology type agnostic microservice comprises:
   executing part of the normalized data associated with the named entity in a second off-chain operation in a second private execution environment, and
   utilizing second off-chain data associated with the named entity for executing the second off-chain operation in the second private execution environment;
causing to record, in the distributed registry on the blockchain, a first result of executing the first off-chain data by the first application to the blockchain; and
causing to record, in the distributed registry on the blockchain, a second result of executing the second off-chain data by the second application to the blockchain, wherein the first result and the second result are associated with the named entity and are identifiable on the blockchain using the record of identity.

9. The non-transitory computer-readable medium of claim 8 wherein the identity is extracted by an identity microservice.

10. The non-transitory computer-readable medium of claim 8 further comprising applying logic in a real-time operation in executing the first blockchain technology type agnostic microservice and the second blockchain technology type agnostic microservice.

11. The non-transitory computer-readable medium of claim 8 further comprising applying a historical event to the blockchain block.

12. The non-transitory computer-readable medium of claim 8, wherein the first off-chain data is obtained from a third-party data source.

13. The non-transitory computer-readable medium of claim 8, wherein the first private execution environment is a local storage or a cloud service.

14. The non-transitory computer-readable medium of claim 8, wherein the normalized data are indexed to reflect the historical blockchain events that associated with named entity.

15. A system comprising:
one or more processors;
memory configured to store code comprising instructions, wherein the instructions, when executed by the one or more processors, cause the one or more processors to perform steps comprising:
   creating an identity of a named entity that is associated with a blockchain address that uniquely identifies the named entity;
   recording a record of the identity in a distributed registry on a blockchain, the record of the identity including the blockchain address that uniquely identifies the named entity;
   receiving a plurality of blockchain blocks containing historical blockchain events that are associated with the blockchain address, the blockchain blocks having data related to the historical blockchain events related to the named entity
   extracting the data associated with the historical blockchain events related to the named entity and normalizing the extracted data to provide normalized data;
   providing the normalized data to a first application operated by a first party and to a second application operated by a second party, wherein each of the first application and the second application comprises at least one of a plurality of blockchain technology type agnostic microservices, wherein each blockchain technology type agnostic microservice comprises a plurality of code units each providing a type of functionality, wherein the first application comprises a first blockchain technology type agnostic microservice and the second application comprises a second blockchain technology type agnostic microservice; and
   executing the first blockchain technology type agnostic microservice of the first application, wherein executing the first blockchain technology type agnostic microservice comprises:
      executing part of the normalized data associated with the named entity in a first off-chain operation in a first private execution environment, and
      utilizing first off-chain data associated with the named entity for executing the first off-chain operation in the first private execution environment;
   executing the second blockchain technology type agnostic microservice of the second application, wherein executing the second blockchain technology type agnostic microservice comprises:
      executing part of the normalized data associated with the named entity in a second off-chain operation in a second private execution environment, and
      utilizing second off-chain data associated with the named entity for executing the second off-chain operation in the second private execution environment;
   causing to record, in the distributed registry on the blockchain, a first result of executing the first off-chain data by the first application to the blockchain; and
   causing to record, in the distributed registry on the blockchain, a second result of executing the second off-chain data by the second application to the blockchain, wherein the first result and the second result are associated with the named entity and are identifiable on the blockchain using the record of identity.

16. The system of claim 15 wherein the identity is extracted by an identity microservice.

17. The system of claim 15 further comprising applying logic in a real-time operation in executing the first blockchain technology type agnostic microservice and the second blockchain technology type agnostic microservice.

18. The system of claim 15 further comprising applying a historical event to the blockchain block.

19. The system of claim 15, wherein the first off-chain data is obtained from a third-party data source.

20. The system of claim 15, wherein the first private execution environment is a local storage or a cloud service.

* * * * *